Patented Jan. 30, 1945

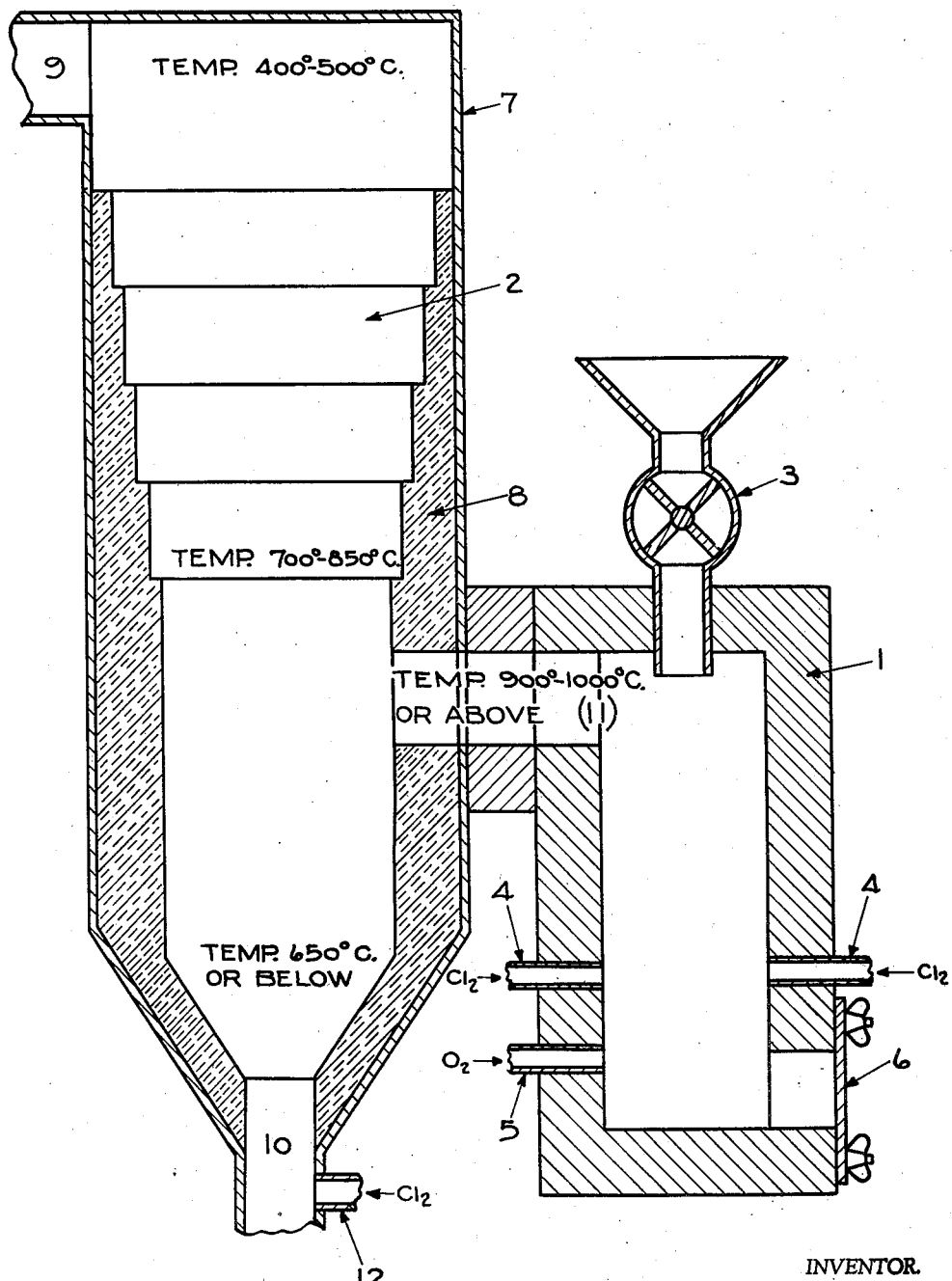

2,368,319

UNITED STATES PATENT OFFICE 2,368,319

CONDENSATION OF CHROMIC CHLORIDE

Irving E. Muskat, Akron, Ohio, assignor to Pittsburgh Plate Glass Company, Allegheny County, Pa., a corporation of Pennsylvania Application May 19, 1941, Serial No. 394,053

9 Claims. (Cl. 23—87)

This invention relates to the condensation of chromium chlorides and to the production of anhydrous chromic chloride. In United States Letters Patent No. 2,185,218, granted to myself and Norman Howard, and in my United States Letters Patent Nos. 2,240,345 and 2,242,257, methods are described wherein a chromium bearing material is chlorinated under conditions such that chromium chloride is formed and vaporized. In the chlorination of iron chromium bearing materials a mixture of iron and chromium chloride is thus formed.

The condensation of chromium chloride from the vapor mixture thus obtained has been complicated by reason of the fact that the iron chloride tends to contaminate the condensed chromium chloride and that the production of chromic chloride of high purity and good crystal size is extremely difficult. Moreover, attempts to maintain the temperature within the condenser at a value such that an accurate separation of iron and chromium chlorides can be secured have often been unsuccessful.

Attempts to conduct the condensation of chromic chloride upon the walls of the condenser have been found to be open to numerous objections. The chromic chloride thus obtained condenses in the form of hard crystalline masses which adhere tightly to the walls. This necessitates the use of scrapers and other moving parts within the condenser which are often corroded by the halide vapors or rendered inoperative by condensation of the halides upon the moving parts.

In accordance with the present invention, I have been able to avoid difficulties of temperature maintenance and to condense vaporized chromic chloride in the form of crystals of high purity and uniform size in a simple manner. I have found that chromic chloride may be condensed in a state of high purity and in the form of comparatively large crystals, for example, in platelets measuring from 0.1 to 1.0 mm. in length, by conducting the condensation in the vapor phase and away from the walls of the condenser, whereby only a minor portion, if any, of the condensation occurs upon the walls of the condenser. Moreover, the difficulties encountered in maintaining the temperature at the required value within the condenser have been overcome since I have been able to control the temperature within the condenser by control of the chlorination of the ore, whereby application of external heat to the condenser is found to be unnecessary.

By condensing the chromic chloride in vapor phase a distinctly superior product is obtained. Thus, it is found that whereas the chromic chloride obtained by condensation upon a wall is in the form of a hard crystalline mass which must be removed by scrapers and thereafter crushed to desirable size, crystalline particles of substantially uniform size may be secured by the present method. Since these crystals do not adhere to the condenser wall to any appreciable degree and are easily removed from the condenser, the necessity for scrapers or other moving equipment within the condenser is eliminated.

In order to secure chromic chloride of high purity and suitable crystal size it has been found desirable to conduct the condensation of the chromic chloride in a tower. In this process the vapors from the chlorination furnace are introduced into a central or lower portion of a tower and are allowed to cool while flowing upwardly toward the tower outlet. During this treatment chromic chloride particles condense in the upper portion of the tower and settle by force of gravity countercurrent to the upward moving vapors. As the chromic chloride crystals fall through the chromic chloride vapor the crystals are bathed by the vapors and thereby iron chloride or other halide which may have been condensed therewith is revolatilized. At the same time, these crystals serve as nuclei for the condensation of a further portion of chromic chloride whereby crystals of substantial size may be secured and a dust-free product thereby obtained.

The invention will be more fully understood by reference to the accompanying drawing which is a diagrammatic sectional view of an apparatus capable of use in accordance with the present invention. As therein illustrated, the apparatus comprises a chlorination shaft furnace 1, connected to a condenser 2. The furnace is provided with a hopper and feeder 3, for feeding ore into the furnace, chlorine tuyères 4, air or oxygen tuyères 5, and a suitable outlet for unchlorinated residue 6. The condenser comprises a cylindrical shell 7, lined with heat insulation 8. In order to permit the establishment of zones of different temperature throughout the column, the thickness of the insulation is varied, tapering, as illustrated, toward upper portion of the tower so that the uppermost portion thereof may be substantially uninsulated. In like manner, the thickness of insulation at the base of the condenser may be less than that at the central portion thereof. The condenser is provided with an inlet 11, for vaporized halides, an outlet 10, for removing condensed chloride and an outlet 9, for removal of gases. Often the condenser inlet is located as to introduce the halide vapors tangentially in order to cause the gases to whirl within the condenser.

In the operation of this process the furnace is heated to a suitably high temperature, for example 1000° C., by burning coke or combustible gas therein. Thereafter, a charge of ore and carbon is introduced by means of the feeder 3, and chlorine and air or oxygen introduced through tuyères 4 and 5 respectively and chlorination is initiated. The vapors of chromium and iron chloride formed are withdrawn into the condenser through inlet 11, at a temperature as high as about 850 to 1000° C. and often much higher than this value, and are allowed to pass upwardly through the condenser. During this upward passage they are cooled to a temperature of 700 to 850° C. at a central portion of the condenser designated in the drawing and a temperature of about 400 to 500° C. at the top of the tower, whereupon chromic chloride is condensed. By use of a condenser of sufficient diameter and height, it is possible to effect the major portion of this condensation in vapor phase, whereby condensation of chromic chloride upon the walls and consequent plugging is minimized. This permits production of chromic chloride crystals of high purity and uniform crystal structure.

The chromic chloride crystals thus formed fall through the condenser to the base thereof and are removed through outlet 10. It will be noted that a large portion of the condensation of the chromic chloride occurs in an upper portion of the tower and that the crystals thus formed settle by force of gravity through the upwardly directed stream of vaporized halides. Thus, the crystals are bathed in an atmosphere of halide gases at a temperature which gradually increases until the crystals have fallen below inlet 11, and iron chloride or other impurity which may have been condensed therewith is revolatilized. During this treatment these crystals grow due to condensation of a further quantity of chromium chloride thereupon whereby comparatively large crystals are obtained.

In order to maintain the process in continuous operation it is preferred to introduce ore, chlorine and carbon and oxygen, if necessary, into the furnace reactor at a rate sufficient to maintain the temperature of reactor at least 900° C. and preferably above 1250° C. Ordinarily, this may be done as described in Patents 2,185,218, 2,240,345, and 2,242,257, previously referred to, by regulating the rate of introduction of chlorine and carbon-ore mixtures, preferably in the form of briquettes in accordance with periodic or continuous observation of the temperature of the reactor. Thus, if the temperatures within the reactor begin to increase to an undesirable degree, the rate of introduction of ore, chlorine, carbon and air may be decreased, while if the temperature is too low these rates may be increased. The temperatures may also be controlled by regulating the rate of withdrawal of the chlorinated residue since a large amount of heat may be dissipated by rapid removal of the residue and the reactor cooled by cool incoming ore. Moreover, the temperature may be controlled by control of the amount of carbon and air or oxygen which is introduced. For a given carbon concentration an increase in the rate of chlorine introduction tends to increase the rate of reaction and consequently, the temperature of operation.

If difficulty is encountered in maintaining the temperature, lumps of carbonaceous material such as coke may be introduced with or without briquettes of ore and the rate of oxygen introduction increased to burn the coke. If the reaction becomes excessively hot it may be cooled by introduction of carbon dioxide.

Since the temperature of the reaction may be regulated with comparative ease at a temperature as high as about 900° C. and particularly above 1250° C., the rate of chlorination is capable of wide variation. In consequence, it is possible to control the temperature within the condenser over a wide area by variation of the rate of chlorination while maintaining the temperature of chlorination at the required value without externally heating the reactor or the condenser. This is particularly advantageous since the necessity of heating a portion of the condenser is eliminated and thus, it is possible to construct the condenser essentially of heat insulating material. Thus, if the temperature at the top of the tower becomes too low, the temperature and/or rate of chlorination may be increased. Likewise, if the temperature within the condenser becomes too high, the temperature and/or rate of chlorination may be decreased. Temperatures at the various portions of the condenser or furnace may be determined by usual thermocouples inserted in suitably located thermocouple wells.

The temperature within the condenser for any given through-put is also dependent upon the size of the condenser. Thus, an increase in the height and/or diameter of a condenser permits establishment of a lower temperature. At all events, the condenser should be sufficiently large to permit the major portion of the condensation to occur out of contact with the furnace walls, whereby most of the chromic chloride is condensed before the gases containing the chloride contact condenser walls, which are cooled to a temperature capable of condensing chromic chloride therefrom, to any substantial degree. In usual operation, condensers having a cross-sectional area of at least about 3 square feet are utilized. In addition, the temperature within the condenser may be controlled by control of the thickness of the insulation. Thus, a variation in temperature from the point of entry to the top of the tower is insured by varying the thickness of insulation throughout the tower.

The carbon concentration in the ore-carbon mixture may be varied in accordance with the amount of oxygen and chlorine introduced into the furnace. When 25 to 50 percent excess chlorine is utilized and sufficient oxygen added to prevent sintering, carbon concentrations of 20 to 25 percent have been found suitable. On the other hand, a decrease in the chlorine concentration requires an increase in the carbon concentration required for substantially complete chlorination and in such cases, 35 to 50 percent carbon is used. The amount of oxygen or air required varies to some extent in accordance with the carbon concentration since with increased carbon some increase in air or oxygen is required. Generally from one-half to three volumes of air per volume of chlorine is used.

In order to prevent contact of the halide vapors with the separated chromic chloride at the base of the condenser and also to improve the purity and crystal structure thereof, an atmosphere of chlorine is maintained in the base of the condenser by introducing chlorine gas through chlorine inlet. As described in copending application Serial No. 404,230, filed July 26, 1941, it has been found that when the chromium chloride is contacted with chlorine at an elevated temperature, for example, not less than 500° C. and preferably above 600° C., the chromic chloride recrystallizes to form a product of higher purity better color and more uniform particle size, whereby a substantially dust-free product is secured. In addition, a substantially iron-free material is obtained.

The uncondensed halides are removed through outlet 9. Thereafter, the halides may be further treated to condense iron chloride or other halide. Processes similar to that herein described may be utilized for this purpose by establishment of correspondingly lower temperatures within the condenser.

The following example is illustrative:

100 parts by weight of ore containing 29.2% Cr, 17.0% Fe, 7.2% Mg and 6.8% Al was mixed with 45 parts by weight of ground coke and 18 parts by weight of molasses. The mixture made up into briquettes ½ to 1 inch in diameter and the briquettes were fired at 500° C. until volatile hydrocarbons were removed.

A shaft furnace having an internal diameter of 16 inches was preheated to 1000° C. by means of a coke fire. Thereafter, a charge of briquettes were introduced and chlorine and oxygen were introduced into the base of the furnace to initiate chlorination. The vapors resulting from the chlorination were introduced into a cylindrical condenser 3 feet in diameter and 20 feet high at a point 15 feet below the top outlet thereof.

The process was carried out continuously for many hours by introducing briquettes at a rate of 150 pounds per hour, chlorine at a rate of 150 pounds per hour and air at a rate of 25 cubic feet per minute. The temperature within the ore bed remained at 1200° C. to 1400° C. throughout the run.

The mixture of vaporized halides entered the condenser at a temperature of 1000° C. and were cooled to a temperature of 450° C. as they rose to the outlet. Chromic chloride condensed in vapor phase in the form of violet colored crystals which settled to the base of the condenser. Sufficient chlorine was introduced into the base of the condenser to maintain an atmosphere which consists largely of chlorine and the temperature at the base of the condenser remained at 450 to 650° C. Chromic chloride in the form of violet crystals of substantially uniform size and containing less than one percent iron chloride was withdrawn from the base of the furnace.

In accordance with the present invention other methods of forming chromic chloride may be used. For example, ferro-chrome or other chromium containing metal may be treated with chlorine in order to chlorinate the same. Likewise, chromium oxide may be subjected to chlorination and the vaporized halide condensed as herein described. Moreover, phosgene, carbon tetrachloride or HCl may be used in conjunction with or in lieu of chlorine for this treatment. In addition, the process may be applied to condensation of chromium chloride produced by other methods such as by chlorination in an externally heated furnace.

The invention is also applicable to the treatment of vapors containing chromous chloride. Thus, the mixtures of chromic chloride and chromous chloride such as may be produced by the process described in my application for Letters Patent Serial No. 378,084, filed February 8, 1941, may be condensed together. In such a case the chromous chloride condensing in liquid state often acts to improve the rate of precipitation of chromic chloride by condensation thereof upon the chromic chloride crystals.

Although the present invention has been described with particular reference to the specific details of certain embodiments thereof, it is not intended that such details shall be regarded as limitations upon the scope of the invention except insofar as included in the accompanying claims.

This application is a continuation-in-part of my application Serial No. 319,273, filed February 16, 1940.

I claim:

1. A method of condensing chromic chloride which comprises passing vaporized chromium chloride upwardly in a tower, cooling the vapor to cause formation of solid chromic chloride particles in gas suspension and maintaining the rate of flow of vapor sufficiently low to permit the chromic chloride to settle in the tower.

2. A method of condensing chromic chloride which comprises passing vaporized chromium chloride upwardly in a tower, cooling the vapor from a temperature of about 850 to 1000° C. at the point of entry into the tower to a temperature of about 400 to 500° C. to cause formation of solid chromic chloride particles in gas suspension and maintaining the rate of flow of vapor sufficiently low to permit a substantial quantity of the chromic chloride to settle in the tower.

3. The method which comprises passing vaporized chromium chloride upwardly through a tower, maintaining the temperature in the upper portion of the tower substantially below that at the point of entry of the vaporized halide, condensing chromium chloride in an upper portion of the tower and regulating the rate of flow of vaporized halide such that the condensed chromium chloride settles through the vapor to and through the zone of higher temperatures adjacent the said point of entry.

4. The method which comprises passing a vaporized mixture of iron and chromium chlorides having a temperature above about 850° C. upwardly through a tower, maintaining the temperature adjacent the tower outlet not substantially less than 400° C. whereby chromic chloride condenses in an upper portion of the tower and maintaining the rate of flow of vapors into the tower sufficiently low to permit the condensed chloride to settle through the hot incoming vapor.

5. The method which comprises introducing a mixture of vaporized iron and chromium chlorides into a central portion of a tower, permitting the halides to flow upwardly in the tower while cooling to cause condensation of chromic chloride from the vapor, withdrawing vaporized iron chloride from an upper portion of the tower and recovering condensed chromic chloride in a lower portion thereof.

6. The method which comprises introducing a gaseous mixture comprising vaporized chromium chloride into a central portion of a tower, permitting the gas to flow upwardly while cooling to cause condensation of chromium chloride, withdrawing uncondensed gases from an upper portion of the tower and recovering condensed chromium chloride in a lower portion thereof.

7. A method of condensing chromium chloride from a gaseous mixture containing iron and chromium chloride and an oxide of carbon which comprises passing the mixture upwardly, cooling the mixture to cause precipitation of chromic chloride chromium and maintaining the rate of flow of gaseous mixture sufficiently low to permit settling of precipitated chloride therefrom.

8. A method of condensing chromium chloride from a gaseous mixture containing iron and chromium chloride and an oxide of carbon which comprises passing the mixture upwardly, cooling the mixture to cause precipitation of chromic chloride and maintaining the rate of flow of gaseous mixture sufficiently low to permit settling of precipitated chloride therethrough.

9. A method of condensing chromium chloride from a gaseous mixture containing iron and chromium chloride and an oxide of carbon which comprises passing the mixture upwardly, cooling the mixture to about 400 to 500° C. to cause precipitation of a chloride of chromium and maintaining the rate of flow of gaseous mixture sufficiently low to permit settling of precipitated chloride therefrom.

IRVING E. MUSKAT.